US 6,600,733 B2

(12) United States Patent
Deng

(10) Patent No.: US 6,600,733 B2
(45) Date of Patent: *Jul. 29, 2003

(54) SYSTEM FOR INTERCONNECTING PACKET-SWITCHED AND CIRCUIT-SWITCHED VOICE COMMUNICATIONS

(75) Inventor: Shuang Deng, Sudbury, MA (US)

(73) Assignee: Verizon Laboratories Inc., Waltham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/796,156

(22) Filed: Feb. 6, 1997

(65) Prior Publication Data
US 2002/0097708 A1 Jul. 25, 2002

(51) Int. Cl.[7] .............................................. H04L 12/66
(52) U.S. Cl. ...................................... 370/352; 370/401
(58) Field of Search ................................ 370/352, 353, 370/354, 355, 356, 392, 401, 402, 403, 404, 405, 466, 467, 474, 260, 261; 395/200.34, 200.36, 200.57, 200.79, 200.8; 379/219, 220; 709/249, 250

(56) References Cited

U.S. PATENT DOCUMENTS

| 4,592,048 A | * | 5/1986 | Beckner et al. ............. 370/354 |
| 4,723,238 A | * | 2/1988 | Isreal et al. .................. 370/352 |
| 5,127,001 A | * | 6/1992 | Steagall et al. ............. 370/267 |
| 5,195,090 A | | 3/1993 | Bolliger et al. ............. 370/94.1 |
| 5,305,308 A | | 4/1994 | English et al. ............. 370/32.1 |
| 5,341,374 A | * | 8/1994 | Lewen et al. ............... 370/450 |
| 5,604,737 A | * | 2/1997 | Iwami et al. ................ 370/352 |
| 5,610,910 A | | 3/1997 | Focsaneanu et al. ........ 370/351 |
| 5,654,957 A | * | 8/1997 | Koyama ...................... 370/355 |
| 5,668,854 A | * | 9/1997 | Minakami et al. ............ 379/88 |
| 5,691,985 A | * | 11/1997 | Lorenz et al. ............... 370/401 |
| 5,724,355 A | * | 3/1998 | Bruno et al. ................. 370/401 |
| 5,724,412 A | * | 3/1998 | Srinivasan ................ 379/93.23 |
| 5,742,596 A | * | 4/1998 | Baratz et al. ................ 370/356 |
| 5,745,556 A | * | 4/1998 | Ronen .................... 379/114.01 |
| 5,838,665 A | * | 11/1998 | Kahn et al. .................. 370/260 |
| 5,883,891 A | * | 3/1999 | Williams et al. ............ 370/356 |
| 5,889,774 A | * | 3/1999 | Mirashrafi et al. .......... 370/352 |
| 5,905,736 A | * | 5/1999 | Ronen et al. ................ 370/352 |
| 5,940,479 A | * | 8/1999 | Guy et al. ................. 379/93.01 |
| 6,069,890 A | * | 5/2000 | White et al. ................. 370/352 |
| 6,091,960 A | * | 7/2000 | Raith et al. ................. 455/426 |
| 6,243,373 B1 | * | 6/2001 | Turock ....................... 370/352 |

FOREIGN PATENT DOCUMENTS

| WO | 97/14238 | * | 4/1997 | ........... H04L/12/46 |
| WO | 97/23078 | * | 6/1997 | ........... H04L/12/56 |

* cited by examiner

Primary Examiner—Kwang Bin Yao
(74) Attorney, Agent, or Firm—Leonard Charles Suchyta; James K. Weixel

(57) ABSTRACT

A system and method for establishing voice communication between a packet-switched network and a circuit-switched network includes a network interface unit for coupling to the packet-switched network, a phone interface unit for coupling to the circuit-switched network and a gateway processor coupled to the network interface unit and to the phone interface unit. In response to a call request, a packet-switched network connection is established between the gateway processor and a first station in the packet-switched network, and a circuit-switched network connection is established between the gateway processor and a second station in the circuit-switched network. Incoming voice data packets received from the first station are converted to outgoing voice signals, which are transmitted over the circuit-switched network connection to the second station. Incoming voice signals received from the second station are converted to outgoing voice data packets, which are transmitted over the packet-switched network connection to the first station. A conference call may be established among three or more conference call participants.

29 Claims, 11 Drawing Sheets

```
                    CHANNEL      SAMPLES / UNIT
                       |               |
SAMPLE RATE    BYTES / UNIT   ENCODING SCHEME
     |              |               |
  ┌─────────────────────────────────────────────────┐
  │ 69 fd f8  e3 7e 6b  f7 ed  66 5c  65 f8 ee 7e ed 77 │
  │ 6a ff f7  e2 e0 e7  f6 61  60 73  f4 e9 e5 de df 7b │
  │ fd e3 db  f2 7a 6c  5b 5a  5e 65  6a ea e4 ef 72 5b │
  │ 5e 6e 7d  f4 e1 dc  e2 6c  7b f7  6b 6f 73 6e 71 ea │
  │ dd dd dc  dd ea 75  6c 6f  f8 fa  6c 7b ef 77 65 5f │
  │ 76 e4 e5  ef 76 6c  79 ee  fa 6c  62 66 7a 71 64 6c │
  └─────────────────────────────────────────────────┘
```

FIG. 4

SYSTEM FOR INTERCONNECTING PACKET-SWITCHED AND CIRCUIT-SWITCHED VOICE COMMUNICATIONS

FIELD THE INVENTION

This invention relates to communication between circuit-switched and packet-switched networks, and more particularly, to methods and apparatus for switching real-time voice signals between these two types of networks.

BACKGROUND OF THE INVENTION

Various packet-switched voice communications systems have been developed exclusively for communications within a packet-switched computer network, such as the Internet. These systems include software running on two computers which communicate with each other using a client-server model. A user speaks into a microphone connected to a source computer. The user's voice is digitized and is placed into data packets by a client process on the source computer. The packets of voice data are then sent over the packet-switched network to a server process on the destination computer. The server process extracts the voice data from the packet, converts it to analog format and sends the analog signal to a speaker. Full-duplex communication is provided by having each computer run both a client process for sending and a server process for receiving. An example of such a software package is Microsoft Corporation's Net-Meeting Software.

One drawback to these types of systems is that communications are strictly limited to other computer users on the packet-switched computer network. Since the voice is digitized and placed into packets which are sent one at a time over the network, only computers which are interconnected to the same network and use the same protocols have the ability to communicate with each other. Packet-switched networks are referred to as connectionless networks, since each individual packet may take a different route through the network on its way from a source to a destination computer. The end user perceives a seamless connection referred to as a virtual circuit.

By contrast, circuit-switched networks, such as the Public Switched Telephone Network (PSTN), use a vast network of interconnected switching centers known as the Public Switched Telephone Network (PSTN). On these networks, special signaling is used to set up a dedicated circuit connection for the duration of a telephone call. Since the same physical circuit is used to send and receive voice signals during the entire call, these networks are referred to as connection oriented networks.

Interconnecting circuit and packet-switched networks presents a problem. Since the two types of networks use different signaling and protocols at various data communications layers, the communication techniques of these networks are incompatible. Wiring that is commonly used for packet-switched networks, such as Ethernet cable, is incompatible with circuit-switched networks, which commonly use twisted pair cabling.

Accordingly, there is a need for a method and apparatus for interconnecting voice connections between circuit-switched and packet-switched networks.

SUMMARY OF THE INVENTION

According to a first aspect of the invention, a system for establishing voice communication between a packet-switched network and a circuit-switched network is provided. The system comprises a network interface unit for coupling to the packet-switched network, a phone interface unit for coupling to the circuit-switched network and a gateway processor coupled to the network interface unit and coupled to the phone interface unit. The gateway processor, the network interface unit and the phone interface unit respond to a call request received from a first station in the packet-switched network or a second station in the circuit-switched network by establishing a packet-switched network connection through the network interface unit between the first station and the gateway processor and by establishing a circuit-switched network connection through the phone interface unit between the second station and the gateway processor. Incoming voice data packets received from the first station over the packet-switched network connection are converted to outgoing voice signals that are compatible with the circuit-switched network. The outgoing voice signals are transmitted over the circuit-switched network connection to the second station. Voice signals received from the second station over the circuit-switched network connection are converted to outgoing voice data packets. The outgoing voice data packets are transmitted over the packet-switched network connection to the first station. Thus, two-way voice communication is established between the first station and the second station. The system may be configured to permit origination of a call request from the first station in the packet-switched network, the second station in the circuit-switched network, or both.

The packet-switched network connection may include an incoming packet-switched network connection and an outgoing packet-switched network connection. The circuit-switched network connection may include an incoming circuit-switched network connection and an outgoing circuit-switched connection. The gateway processor may execute a server process for establishing the incoming packet-switched network connection and the outgoing circuit-switched network connection and for controlling reception of the incoming voice data packets from the first station over the incoming packet-switched network connection and transmission of the outgoing voice signals to the second station over the outgoing circuit-switched network connection. The gateway processor may further execute a client process for establishing the incoming circuit-switched network connection and the outgoing packet-switched network connection and for controlling reception of the incoming voice signals from the second station over the incoming circuit-switched network connection and transmission of the outgoing voice data packets to the first station over the outgoing packet-switched network connection. In another embodiment, the server process and the client process are combined in a single process.

The gateway processor may include conference call means responsive to a conference call request received from the first station or the second station for establishing a conference call among three or more conference call participants. At least one of the conference call participants is located in the packet-switched network, and at least one of the conference call participants is located in the circuit-switched network. The conference call means includes means for establishing a conference call network connection to each of the conference call participants.

According to another aspect of the invention, a method for establishing voice communication between a packet-switched network and a circuit-switched network is provided. A gateway computer is interconnected between a packet-switched network and a circuit-switched network.

The gateway computer responds to a call request received from a first station in the packet-switched network or a second station in the circuit-switched network by establishing a packet-switched network connection between the first station and the gateway computer, and by establishing a circuit-switched network connection between the second station and the gateway computer. The gateway computer responds to incoming voice data packets received from the first station over the packet-switched network connection by converting the incoming voice data packets to outgoing voice signals that are compatible with the circuit-switched network and by transmitting the outgoing voice signals over the circuit-switched network connection to the second station. The gateway computer responds to incoming voice signals received from the second station over the circuit-switched network connection by converting the incoming voice signals to outgoing voice data packets and by transmitting the outgoing voice data packets over the packet-switched network connection to the first station. Thus, two-way voice communication is established between the first station and the second station.

According to a further aspect of the invention, a method for establishing voice communication between a first station in a first circuit-switched network and a second station in a second circuit-switched network is provided. A first circuit-switched network connection is established between the first station and a first gateway computer. The first gateway computer is interconnected between the first circuit-switched network and a packet-switched network. A packet-switched network connection is established between the first gateway computer and a second gateway computer in the packet-switched network. The second gateway computer is interconnected between the packet-switched network and the second circuit-switched network. A second circuit-switched network connection is established between the second gateway computer and the second station through the second circuit-switched network. Voice information is sent between the first station and the second station over the first circuit-switched network connection, the packet-switched network connection, and the second circuit-switched circuit connection.

BRIEF DESCRIPTION OF THE DRAWINGS

For better understanding of the present invention, reference is made to the accompanying drawings, which are incorporated herein by reference and in which:

FIG. 4 shows an example of mu-law encoded voice data.

DETAILED DESCRIPTION

Figure 1:
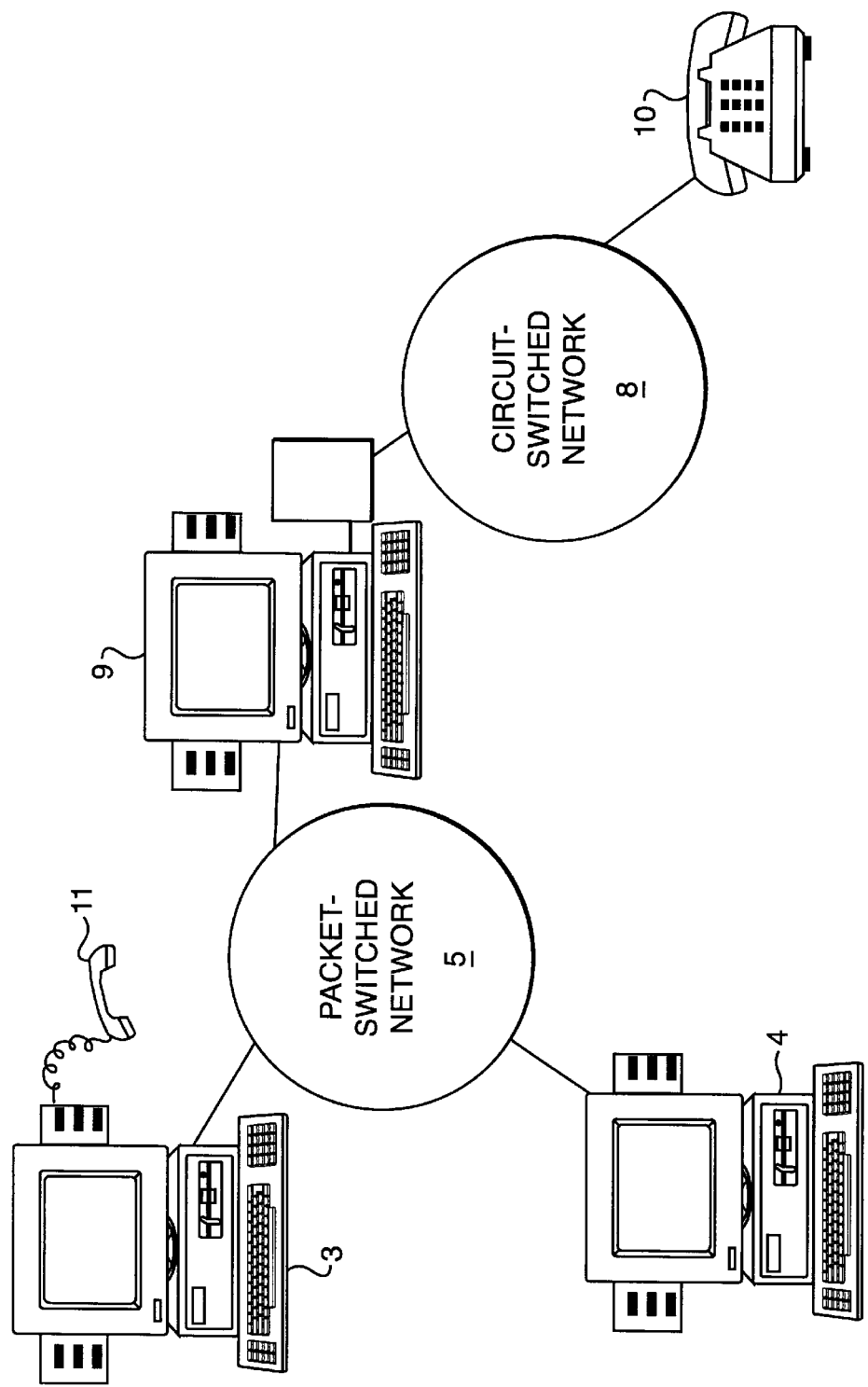
FIG. 1 is a block diagram of a system wherein voice communication is established between packet-switched and circuit-switched networks.

An example of a system architecture which embodies the present invention is shown in FIG. 1. A packet-switched network 5, such as the Internet, is interconnected to a circuit-switched network 8, such as the Public Switched Telephone Network (PSTN). Remote host computers 3 and 4 are connected to the packet-switched network 5. Telephone equipment, such as a telephone handset 10, is connected to circuit-switched network 8. A gateway host computer 9 interconnects the circuit and packet switched networks to provide a link for voice communications between the two. Voice channels on each network may be connected to the other network through the gateway host computer, so that callers on the packet-switched network may speak to called parties on the circuit-switched network, and vice-versa.

For example, a user of the remote host computer 3 may place a voice call from an attached telephone handset 11 (speaker/microphone combination) to telephone equipment, such as telephone handset 10, attached to the circuit-switched network. The telephone equipment may be telephone equipment other than a telephone handset, such as an answering machine, or a computer equipped to receive incoming voice telephone calls, as well as other devices known in the art that may be connected to circuit-switched networks. When the telephone handset 10 is answered by the person being called, voice communications may begin between the user of the remote host computer 3 and the user of the telephone handset 10. The communications switching and signaling used to make telephone calls on the circuit-switched network 8 are well known in the art.

To achieve the link between the circuit-switched and packet-switched networks, the gateway host computer 9 uses computer software processes and hardware for controlling the switching and signaling. The gateway host computer 9 is referred to as a "gateway" because it allows communication between two otherwise separate networks. The gateway host computer 9 may use a client-server architecture to handle the individual voice calls, as described below.

The remote host computers 3 and 4 may contain a mechanism, referred to as client software, which interfaces with the user of the remote host computer and communicates with corresponding telephone server software that executes on the gateway host computer. The client software allows the user to place and receive voice calls at the remote host computer. The corresponding telephone server software, executing on the gateway host computer, allows calls to be connected between the packet and circuit-switched networks.

A brief explanation of client-server communications may be beneficial in understanding certain aspects of the present invention. In general, client software is a generic name for application software run by a user on a remote computer system to interface with a central computer system, often referred to as a server. Server software is a generic name for application software which handles the requests and needs (communications channeling for example) of many client software applications which can run at the same time, on different remote host computers. Thus, a server application runs on a server computer and "serves" the needs of client applications running on one or more client computers. Client software and server software, though related, are not to be confused with client and server processes, which will be described briefly below.

Figure 2:
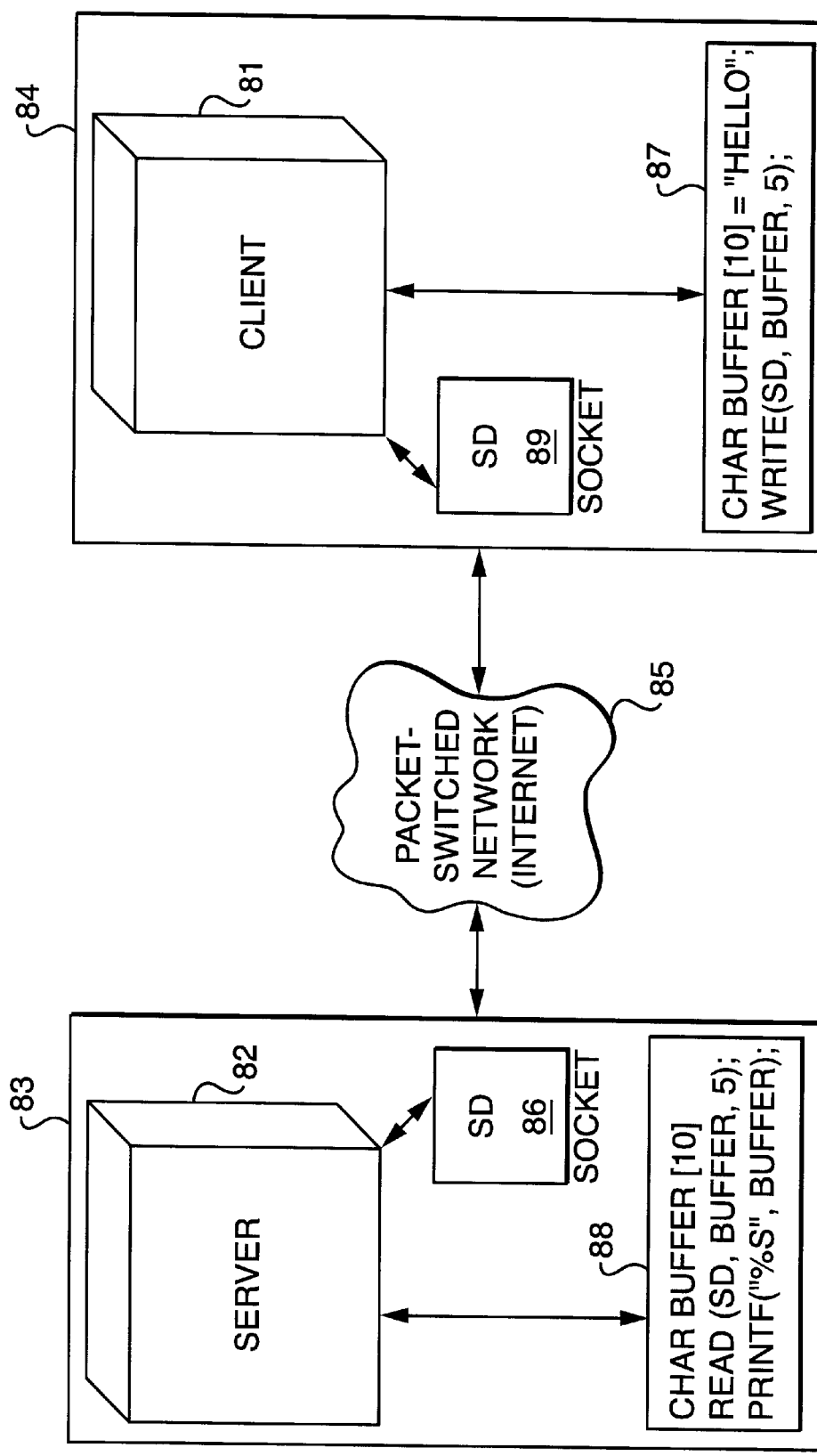
FIG. 2 is a block diagram of related art showing client and server processes communicating on a packet-switched network.

A block diagram of a related art packet-switched network using the client-server architecture is shown in FIG. 2. In this diagram, client and server communication processes 81 and 82 control the transmission of data between two host computers 83 and 84 over a packet-switched network 85. The client-server system may use TCP/IP communications, which is well known in the art. TCP/IP allows the creation of an interface, called a socket, between a server process and a client process. Through sockets 86 and 89, the client 81 and the server 82 to transmit messages to each other in the form of data packets. This form of communication is used widely on packet-switched networks, such as the Internet.

Connection setup in a client-server environment is relatively simple. In the following example, a description using the Transmission Control Protocol/Internet Protocol (TCP/IP) is given. Usually, a client process initiates the connection, since a server process typically receives data from the client process. The client process 81 creates a socket 89 which designates the Internet Protocol (IP) address of a remote host computer 83 and designates a port number to connect with on that remote computer. The port number corresponds to a specific server process 82. Upon connection initiation, the remote host computer 83 receives the incoming connection request, examines the port number, and executes the corresponding server process 82 for that port number. The server process 82 then sets up its socket 86. When each process, both client and server, has set up a socket designating the opposite host and port number, each process can then bind to that socket and begin communications. From then on, the client and server processes may communicate through the socket.

In FIG. 2, after both the server and the client have established socket interfaces with each other, communications may begin. To establish effective communications, the software designer that develops the client and server processes must establish synchronization so that when one process is writing to its socket, the corresponding process on the receiving host computer is reading from its socket. An example of a section of the computer program source code 87 which is executed by the client process 81 is shown in FIG. 2. As shown in the program, text data ("hello") may be placed in a buffer (buffer[10]) and a "write" may be performed to the socket descriptor (sd) which designates the socket 89 on the sending host computer 84. The "5" indicates the length of the text data ("hello") to be sent out of the socket 89 by the "write" command. A section of the server computer program source code 88 executes on the host computer 83. The client and server processes are synchronized. Thus, the server process 82 performs a "read" from its socket 86 when the client process 81 executes the "write" command. The "read" command reads the data from the socket 86 into the buffer. This example shows how five characters of text data may be sent using client-server communications.

Through the use of sockets, source host computer 84 running client process 81 transmits data to destination host computer 83 running server process 82. In the example, the client sent five characters (bytes) of data to the server. Any type of data may be transmitted between client and server processes using sockets.

Figure 3:
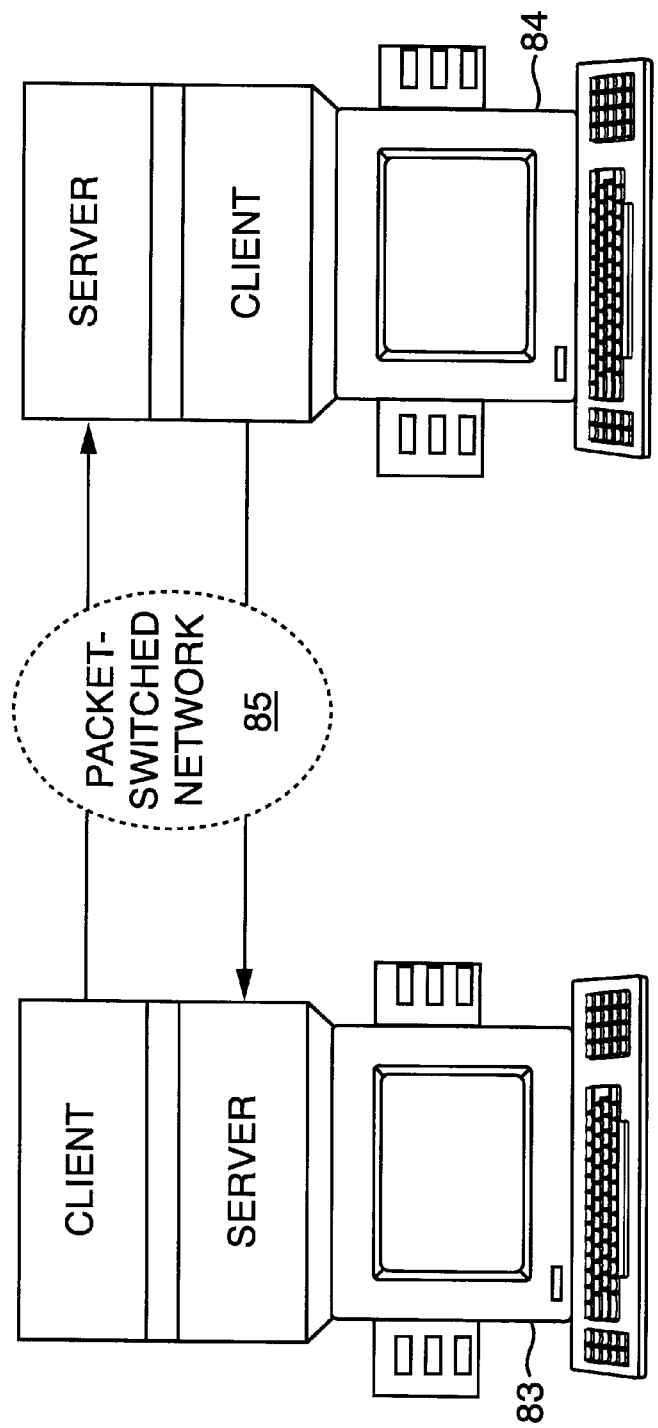
FIG. 3 is a block diagram of related art showing two host computers on a packet-switched network that each execute a client and server process for communicating with one another.

The client-server example of FIG. 2 illustrates half-duplex communications. To implement full-duplex communications between two computers on a packet-switched computer network, a system as shown in FIG. 3 may be used. In FIG. 3, each host computer 83 and 84 on the packet-switched network 85 runs both a client process and a server process. Each client process running on each host computer sends data through sockets, onto the packet-switched network, to a corresponding server process running on the other host computer. By running client and server processes concurrently in each computer, data may be sent in both directions simultaneously. Each client and server process pair may use a corresponding socket pair for communications. This allows each server process to be a continuous listener on its socket and each client process to be a continuous sender on its corresponding socket. When each process has set up its socket communications with its corresponding process, each process may go into a loop of continually sending data as a client process and continually listening for data as a server process. Note that the bytes of data being sent are placed into packets and are transmitted on the communications medium by an underlying communication mechanism within the TCP/IP protocols. Thus, client-server communications provides a standard way to communicate any type of data over many types of communications media on packet-switched networks.

Standard digital sound formats have been created for the transmission of sound over a packet-switched network such as the Internet. An example of audio data encoded in a standard format is shown in FIG. 4. One form of standard audio encoding, referred to as mu-law encoding, consists of header information and a data section as shown. The header information contains parameters such as the sampling rate, channel, bytes per unit, samples per unit, and the encoding scheme which was used to encode the audio data. The header information in mu-law encoding is a vital part of an audio data packet, since it defines how this audio data should be output to a speaker device and what encoding and decoding scheme should be used on the data. The remaining information following the header in mu-law encoding is the data portion, which contains the digitized audio data, encoded in binary according to the scheme that is defined by the header information. Standard mu-law encoding for a mu-law digital audio channel consists of sampling at 8,000 samples per second, where each sample becomes one byte of data, for a resulting 64 kilobit per second data rate. Audio data which has been mu-law encoded into bytes can be sent using the client-server architecture described above.

The above description illustrates how full-duplex voice communication is provided in a packet-switched network. However, communication is limited to the packet-switched network.

Figure 5A:
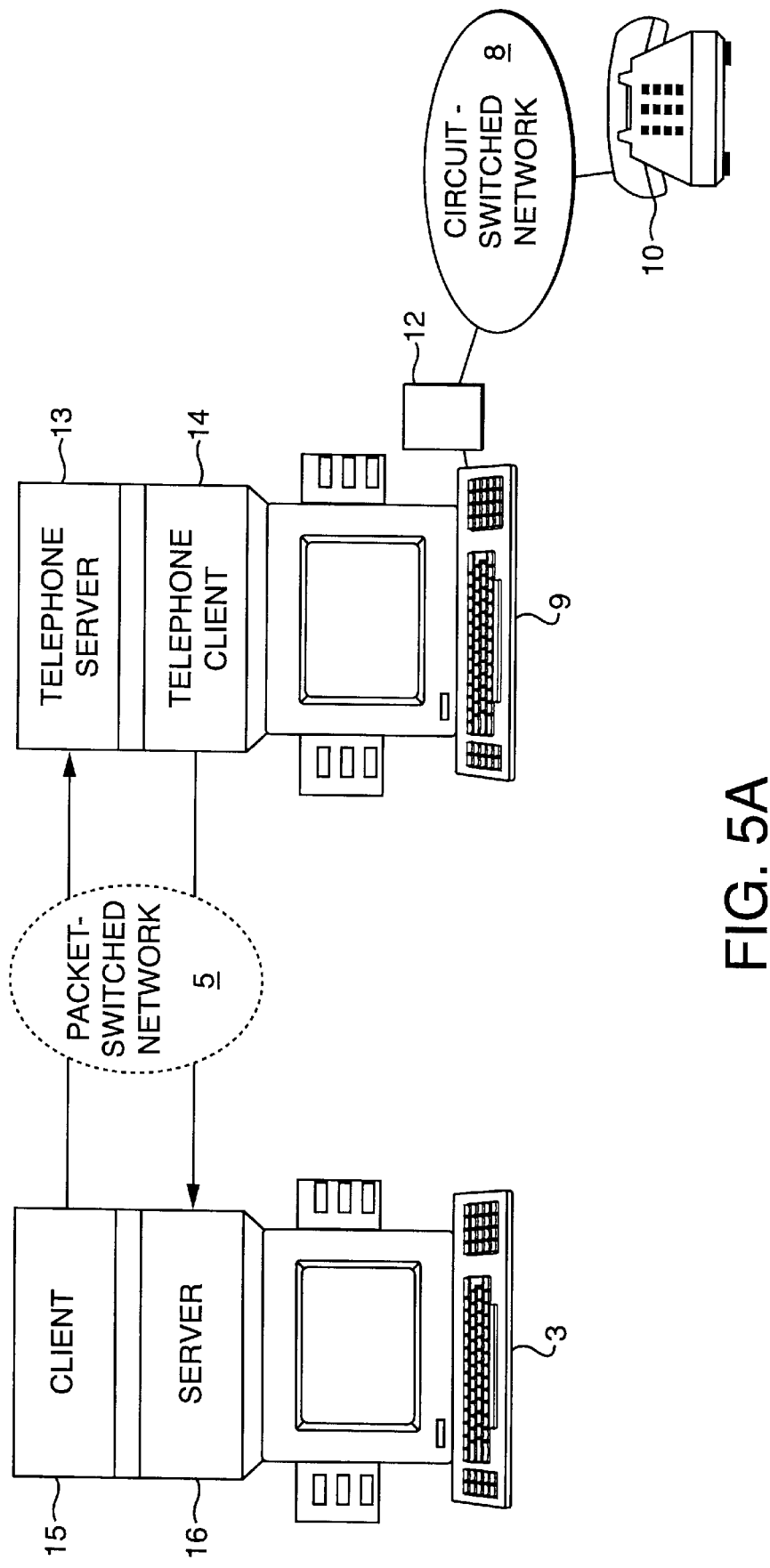
FIG. 5A is a block diagram of a system wherein voice communication is established between circuit and packet switched networks via a gateway host computer.

The present invention overcomes this limitation and provides an interface between a client-server communication system on a packet-switched network and a circuit-switched network, such as the public-switched telephone network (PSTN). A gateway host computer connected to the packet-switched network uses client-server communications and hardware to handle voice communications on the packet-switched network. The gateway host computer also connects to the circuit-switched telephone network. A block diagram of this embodiment of the present invention is shown in FIG. 5A. The gateway host computer 9 runs telephone server process 13 and telephone client process 14. The telephone server and telephone client processes link the circuit and packet-switched networks and channel the data from the packet-switched network to channels on the circuit-switched network, and vice-versa, as explained below. A channel is simply an existing connection on either of the networks.

Figure 5B:
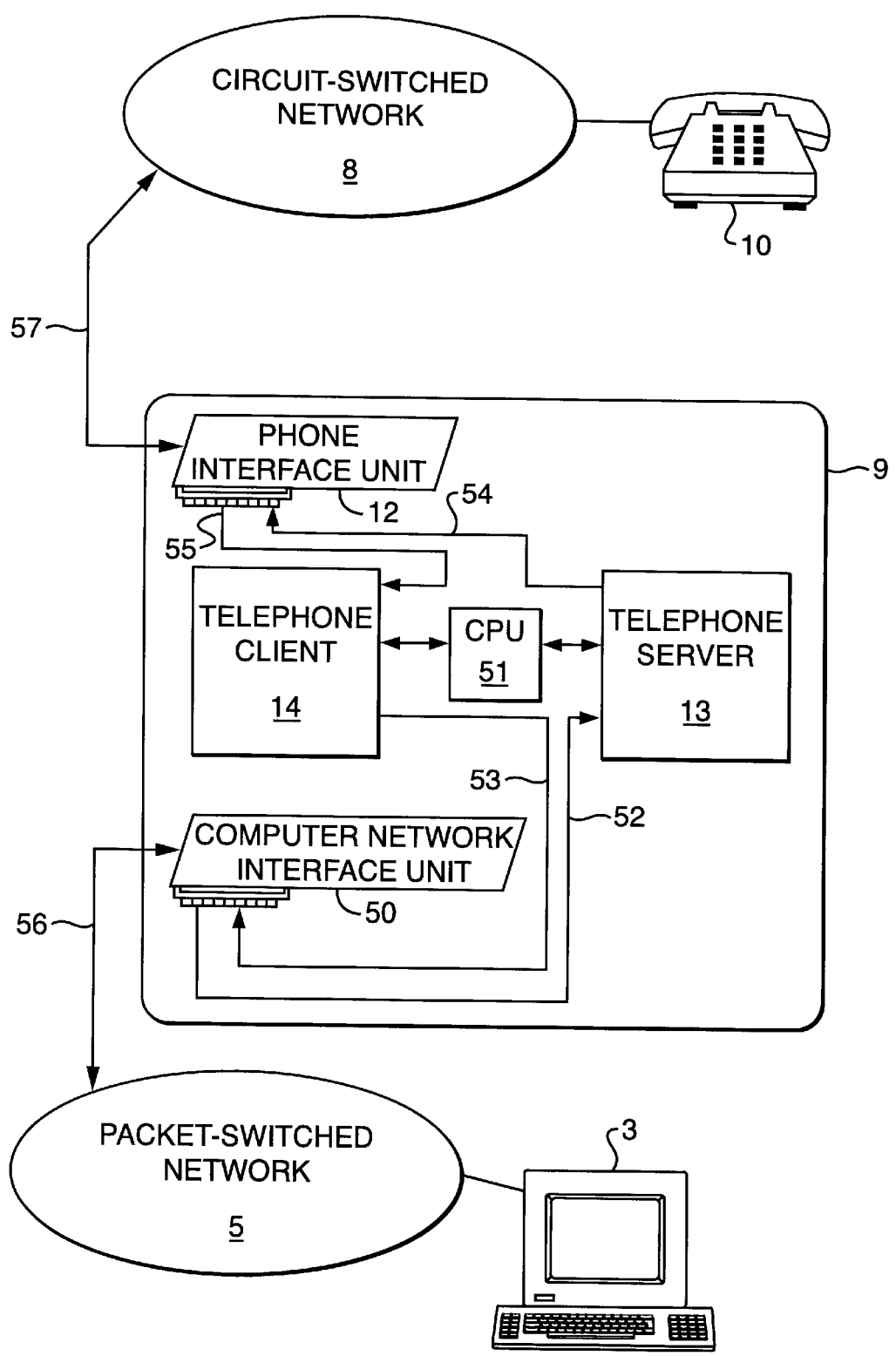
FIG. 5B is a block diagram of a gateway host computer using separate telephone client and telephone server processes.

A more detailed view of the gateway host computer of the present invention is shown in FIG. 5B. The telephone client process 14 and the telephone server process 13 are controlled by a Central Processing Unit (CPU) 51 of the gateway host computer 9. The gateway host computer 9 interconnects the circuit-switched network 8 and the packet-switched network 5. The connection to the packet-switched network is achieved by a computer network interface unit 50. The computer network interface unit 50 may plug into the internal bus (lines 52 and 53) of the gateway host computer. The computer network interface unit 50 allows the gateway host computer 9 to send and receive packets of data from the packet-switched network 5 via network a cable 56. The packets of data on the packet-switched network 5 which have a destination network address designating the gateway host computer 9 are passed from the packet-switched network 5, via the computer network interface unit 50, to communications processes which are executing within the gateway host computer. In the present invention, the telephone server process 13 obtains incoming data on bus line 52. Likewise, the telephone client process 14 may send data to the computer network interface unit 50 on bus line 53. The data is placed into packets and is transmitted on the packet-switched network 5 on network cable 56. Examples of possible computer network interface units are standard Ethernet adapter cards, ATM cards, FDDI cards, and the like, which are known to those skilled in the art.

The connection to the circuit-switched network is achieved via a phone interface unit 12 in the gateway host computer 9 as shown in FIGS. 5A and 5B. The phone interface unit 12 may be a commercial product, an example of which is the D4/2/E phone card from Dialogics Inc. The phone interface unit 12 accepts a connection to a standard circuit-switched line 57, such as a T1 link for example. The phone interface unit plugs into the internal bus of the gateway host computer shown by lines 54 and 55. The phone interface unit 12 provides the gateway host computer with the standardized signaling ability to place and receive calls on the PSTN. The phone interface unit produces signals to dial out from the gateway host computer onto a telephone network. The gateway host computer may also receive incoming telephone calls via the phone interface unit 12 from telephone handset(s) 10 located in the circuit-switched telephone network 8. Call signaling data and voice data are channeled to and from the telephone client-server processes executing on the gateway host computer via the bus lines 54 and 55. As described below, the telephone server process 13 sends voice data to the phone interface unit via bus line 54, and the telephone client process 14 receives voice data from the phone interface unit via bus line 55.

Another function of the phone interface unit is to convert mu-law encoded audio data to analog audio signals, and vise versa. Thus, client and server processes handling mu-law encoded audio data are not required to decode the data into analog format for transmission to and from the circuit-switched network. The phone interface unit may accept the mu-law encoded voice data from the telephone server process, and decode and convert this data into analog signals for transmission on the circuit-switched network. The phone interface unit acts as an analog-to-digital and digital-to-analog converter and has the ability to produce the appropriate standard circuit-switched network analog signal levels based on the decoded and converted mu-law digital voice data. The phone interface unit is not required to perform mu-law encoding and decoding. The client and server processes which communicate with the phone interface unit may perform this function instead. In this case, only analog-to-digital and digital-to-analog conversion are required of the phone interface unit after connection setup. In another variation of the present invention, other encoding schemes may be used instead of mu-law encoding. This decoding and encoding may be performed in the phone interface unit or in the client and server processes.

Another function of the phone interface unit is call connection and disconnection on the circuit-switched-network. The phone interface unit provides the proper signaling needed to establish call connections. When a telephone handset on the circuit-switched network is used to place a call connection to a destination in the packet-switched network, standardized electrical signals indicating an incoming call connection on the PSTN are received at the phone interface unit 12 via bus line 57. The phone interface unit 12 may then provide an indication over bus line 55 to telephone client process 14 of the incoming call connection from the circuit-switched network. The phone interface unit may also handle the signaling requirements of the PSTN to establish a call connection between the calling telephone handset and the phone interface unit. Conversely, when telephone server process 14 on the gateway host computer receives information from a remote host computer that a call is to be placed onto the circuit-switched network, call connection initiation information, such as a phone number, is passed to the phone interface unit via bus line 54. The phone interface unit then provides on line 57 the standardized electrical signaling which is required to place the call on the circuit-switched network and to establish a call connection with destination telephone equipment. Thus, the phone interface unit may be controlled by the server process 13 in order to place calls on the circuit-switched telephone network.

Since the gateway host computer system includes interfaces to each of the separate networks, the telephone client and server processes need some knowledge of the signaling and communication protocol of the circuit and packet-switched networks. Thus, the telephone server process 13 must pass call setup data, such as the phone numbers, to the phone interface unit 12 in order to place calls to one or more destination telephone units located on the PSTN. The telephone client process 14 obtains an indication of one or more incoming calls, which are destined for one or more remote host computers on the packet-switched network, from the phone interface unit 12. When the connections are set up on each network, the telephone client and server processes continuously pass voice data between the two networks for the duration of a call. The phone interface unit 12 and the telephone server process 13 provide voice signals to the telephone equipment on the circuit-switched network. The telephone client process 14 receives the voice data from the incoming call via the phone interface unit 12, and passes the voice data to the remote server process on the destination host computer, via socket communications. These functions permit of real time voice communications between circuit-switched and packet-switched networks.

Figure 6:
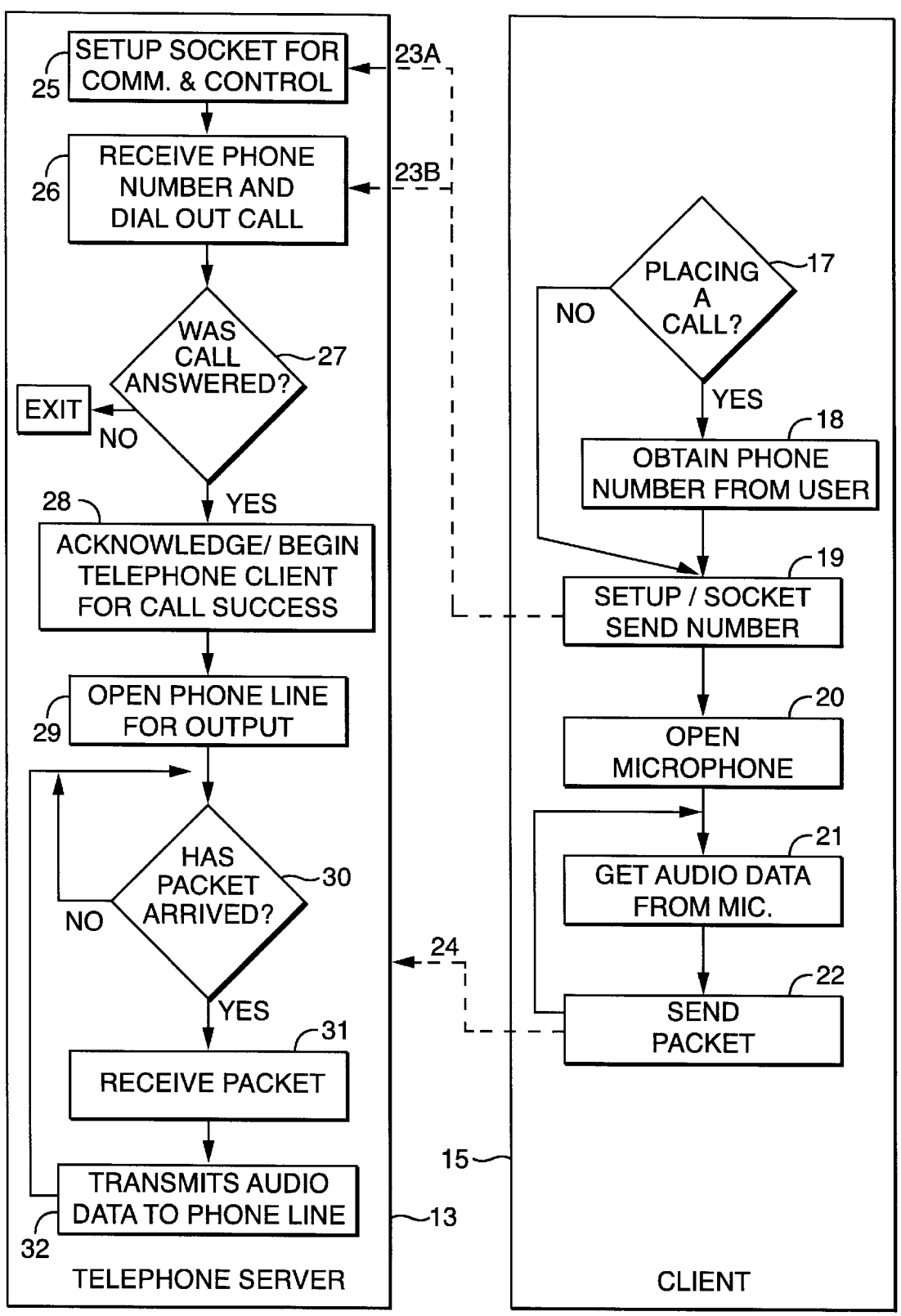
FIG. 6 is a flow chart of a telephone server process in the gateway host computer communicating with a client process on a remote computer.

FIG. 6 is a flow chart of the telephone server process executing on the processor of the gateway host computer. First, an example call from a remote host computer 3 (FIG. 1), connected to the packet-switched network 5, to a destination telephone (handset 10) located on the circuit-switched network 8 is described. The client software process 15 executes on the remote host computer 3. When the client software process 15 is started by a user to place a call, the process proceeds to step 18. Step 17 permits the client software to be started by a server process upon receiving an incoming call, as described below. In step 18, the client software 15 directs the computer user to enter the telephone number to be called. The client software then needs to make a connection over the packet-switched network to the gateway host computer.

In this embodiment of the present invention, portions of the telephone number entered by the user may be used to select a gateway host computer on the packet-switched network 5 for connection with client process 15. For example, if the telephone number entered by the user begins with area code 212, the client software 15 attempts to connect with a gateway host computer located in the New York city area. The three digit prefix of the phone number after the area code may also be used to determine a destination gateway host computer. The client software 15 may maintain a lookup table which designates various gateway host computers on the packet-switched network, based on area codes entered by the user. In this embodiment of the present invention, the user on the packet-switched computer network 5 is not required to have knowledge of the location of the destination gateway computer 9. Instead, the software may allow the user to designate a destination telephone number on the circuit-switched network 8.

In FIG. 6, the client process 15 sets up a socket connection to the gateway host computer 9, in step 19. As discussed previously, the gateway host computer receives the socket request, examines the port number and starts telephone server process 13. The telephone server process 13, upon startup in step 25, sets up a socket for communication with the client process 15. Socket communications setup is indicated by dotted line 23A. The telephone server process may also establish signaling communication with the phone interface unit (not shown in FIG. 6) ensures that the phone interface unit will be able to handle the call connection setup. Communication between the telephone server process 13 and the phone interface unit 12 may be performed via socket communications, via an internal bus using signaling, or by another communications mechanism in the gateway host computer 9.

Referring to FIGS. 5B and 6, after socket communications have been established in steps 19 and 25 between the originating remote host client process 15 and the gateway telephone server process 13, the destination telephone number entered by the user is transmitted in a message from the client process 15 to the telephone server process 13 in step 19. This communication is indicated by the dotted line 23B. The phone number is received by the telephone server pown rocess 13 in step 26. After the telephone number has been received, it is relayed to the phone interface unit 12. The phone interface unit 12, acting as the interface to the circuit-switched network, dials the telephone number on the circuit-switched network and rings the handset 10 corresponding to the dialed telephone number. At this point, no voice communications have been sent from the originating remote host computer 3. Only connection setup has been performed.

If the receiving telephone handset 10 on the PSTN 8 is busy or does not answer after a predetermined number of rings, the telephone server process 13 returns a message indicating call failure (not shown) to the originating client process 15 on the remote host computer 3 and exits (step 27). The message tells the remote client process 15 that the line on the circuit-switched network 8 was either busy or was unanswered. The telephone server process 15 then exits. The originating user may try to place another call at a later time using the client process 15, which would repeat the sequences of steps of FIG. 6.

If the placement of the call on the circuit-switched network (e.g. PSTN) 8 is successful (e.g.: the call is answered), then full-duplex, real-time voice communications may be established between the user on the originating remote host computer 3 and the called party on the PSTN. When the telephone server process 13 receives an indication from the phone interface unit 12 that the call was answered, the telephone server process 13 has certain remaining tasks to be performed before regular voice communications may begin.

First, in step 28, the telephone server process 13 sends a command to the operating system of the gateway host computer 9, via the CPU 51 (FIG. 5B), to start the execution of the telephone client process 14 (FIGS. 5A and 5B). The telephone client process 14, the phone interface unit 12 and computer network interface unit 50 (FIG. 5B) handle the communications from the circuit-switched network 8 to the packet-switched network 5. The telephone server process 13 may also send an acknowledgment message to the calling client process 15 on the remote host computer 3 to inform the originating user (caller) that the call was successfully placed and that communications can begin. Next, the telephone server process 13, in step 29, opens the channel over bus line 54 (FIG. 5B) to the phone line within the phone interface unit 12 for output of voice signals. The telephone server process 13 in the gateway host computer 9 channels the incoming voice data packets received from the remote host computer through the phone interface unit 12 and onto the phone line 57 of the circuit-switched network 8.

The telephone server process 13 in gateway host computer 9 then enters a loop at step 30 which continuously checks for the arrival of incoming voice data packets. These packets are sent from the client process 15 on the originating remote host computer 3 under control of the user who placed the call. When a packet of voice data is received by the telephone server process 13 in step 31, the audio data is relayed to the phone line channel in the phone interface unit 12 in step 32. As stated previously, the phone interface unit 12 converts the voice data from mu-law encoded bytes into analog voice signals and transmits the analog signals on the circuit-switched network 8 to the destination telephone handset 10. Encoding and decoding may be performed by the telephone server process, or by the phone interface unit. The telephone server process 13 channels the data from the computer network interface unit to the phone interface unit, thus controlling the one-way communications from the originating remote host computer 3 to the telephone handset 10 on the circuit-switched PSTN 8.

Figure 7:
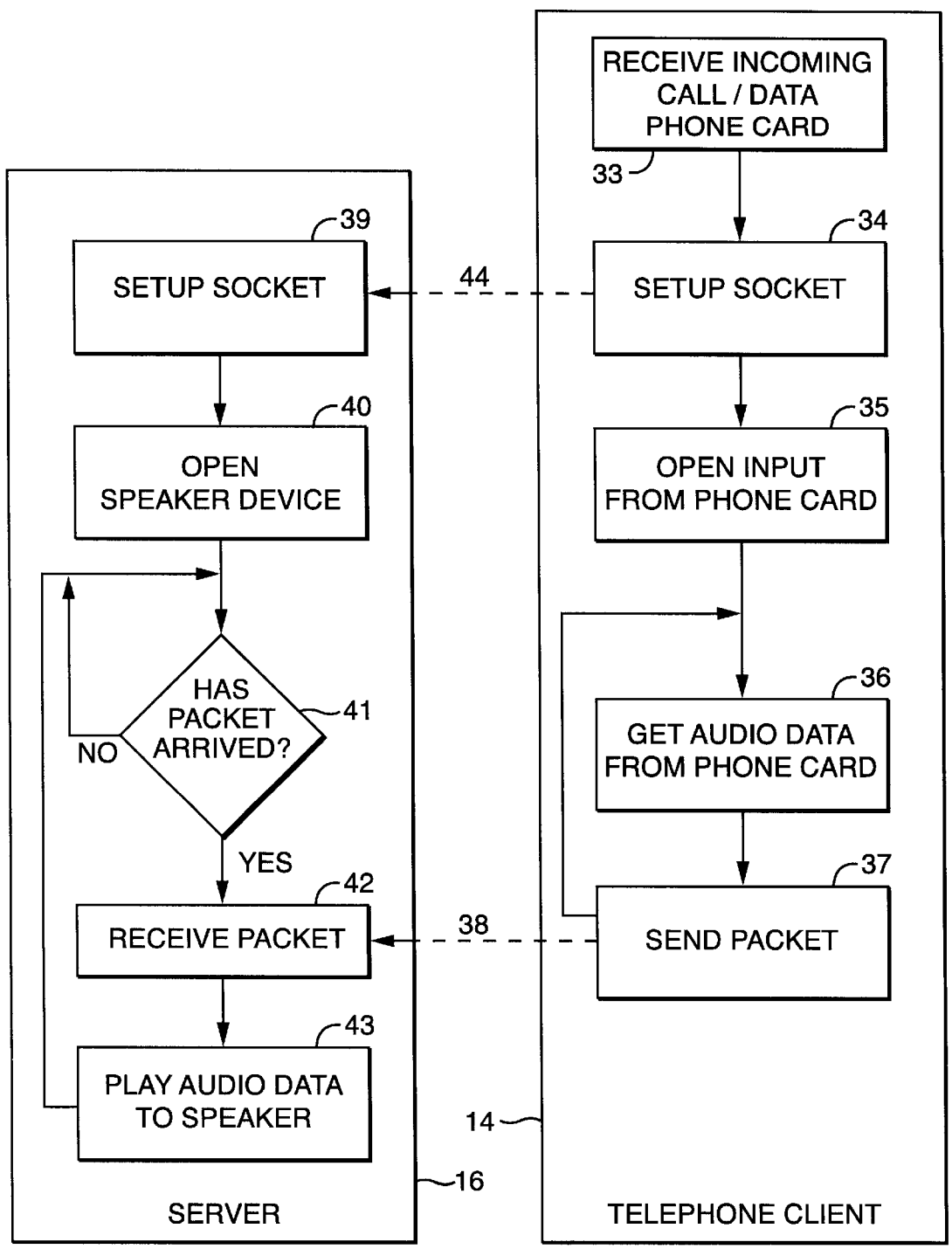
FIG. 7 is a flow chart of a telephone client process in the gateway host computer communicating with a server process on a remote computer.

As stated above, the telephone server process 13 in the gateway host computer initiates a telephone client process 14 to control communication received from the circuit-switched telephone handset 10 and destined for the originating remote host computer 3. The telephone client process 14 is initiated with an operating system call to the central processing unit (CPU) 51 for example. A flow diagram of the telephone client process 14 is shown in FIG. 7. When the telephone server process 13 initiates execution of the telephone client process 14 in step 28 of FIG. 6, information regarding the telephone line call channel and the address of the originating remote host computer 3 are passed to the telephone client process 14 in step 33.

After automatic startup of the telephone client process 14 by the telephone server process 13, the telephone client process 14 initiates socket communications with the destination host computer 3 over bus line 53 and the computer network interface unit 50 in step 34. The socket request arrives at the remote host computer 3, and a server process 16 is started on the remote host computer 3. The server process 16 receives incoming voice data packets, decodes them, and directs them to the speaker of the remote host computer. The remote host computer may contain digital-to-analog converters for converting voice data to analog signals to be supplied to the speaker. The server process 16 handles incoming voice data, which is relayed by the gateway host computer from the telephone handset 10 on the circuit-switched network. When socket communications with the remote host computer 3 have been set up, the telephone client process 14 opens the phone line channel from the phone interface unit 12 for incoming voice data in step 35. The channel information was conveyed to the telephone client process 14 at startup by the telephone server process 13, in step 28 of FIG. 6. At this point, full-duplex real-time voice communications may begin between each end user of the system.

Next, in steps 36 and 37 of FIG. 7, the telephone client process 14 enters a loop which receives mu-law encoded voice data from the phone interface unit 12 in step 36. This mu-law encoded voice data represents the voice of the person speaking into the telephone handset 10. The received voice data may be placed in a buffer. Then, in step 37, a voice data packet is sent via the socket, through the computer network interface unit 50, to the server process 16 in the originating host computer 3. The server process 16 receives the voice data packet sent from the telephone client process 14 in step 42. Then the server process 16 sends the voice data to a circuit for conversion to an analog audio signal for driving a speaker on the originating host computer in step 43. The telephone client process 14 and the associated hardware discussed herein control the one-way communications from the handset 10 on the circuit-switched network 8 to the host computer 3.

In the gateway host computer, the telephone server and client processes, in conjunction with the phone interface unit and the computer network interface unit, provide the interface between the packet and circuit-switched networks. It will be apparent to those skilled in the art that various modifications may be made without deviating from the scope or spirit of the invention.

Figure 8A:
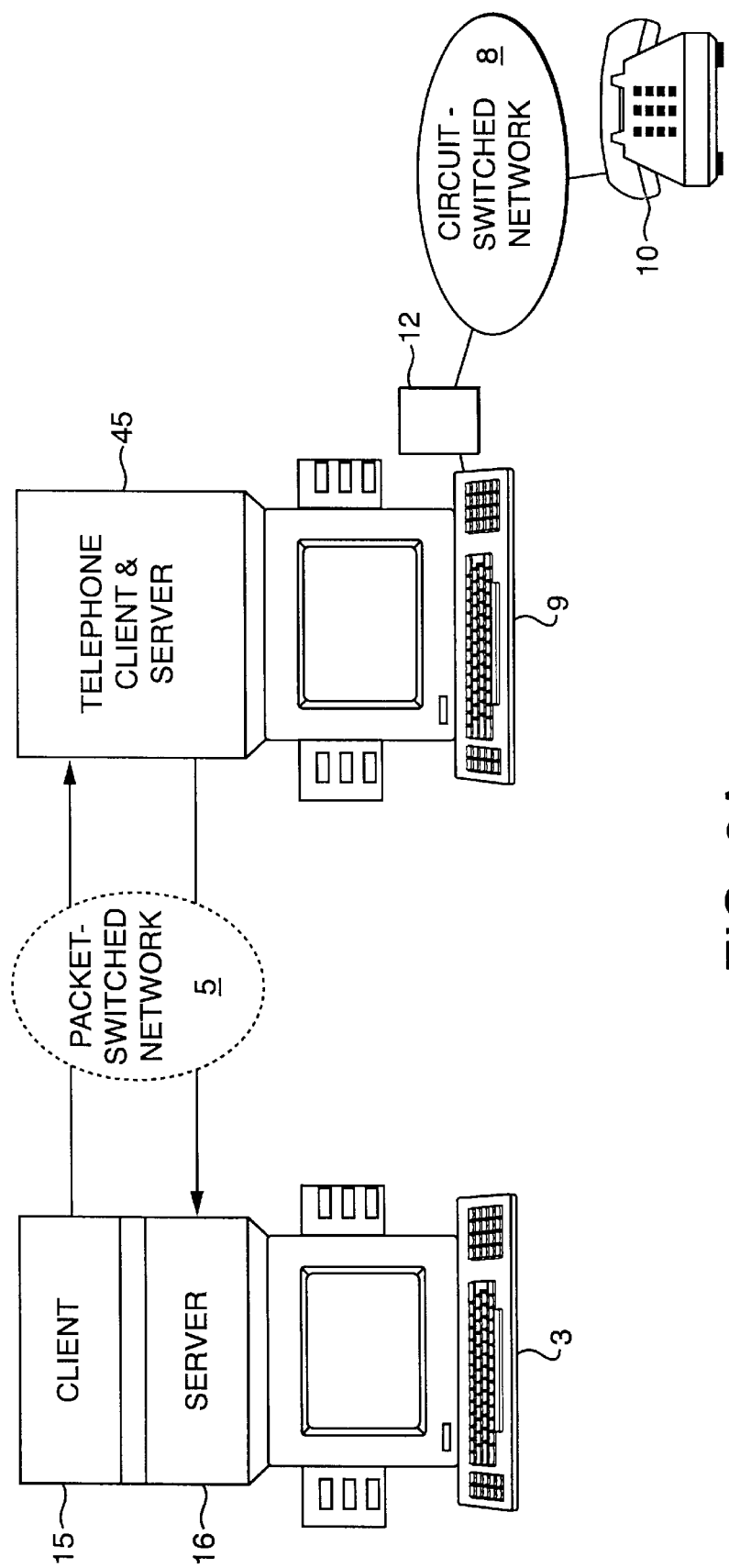
FIG. 8A is a block diagram of a system wherein the telephone client and telephone server processes are merged into one process on the gateway host computer.

For example, the telephone server and telephone client processes which execute on the gateway host computer may be merged into one single telephone client and server process 45 as shown in FIG. 8A. This configuration may conserve operating system scheduling and memory resources. In the example of FIGS. 5A and 5B, both telephone server and telephone client processes enter repetitive loops to send and receive packets, respectively, as shown in the flowcharts of FIGS. 6 and 7. Checking for packet arrival, which is a server task, and sending a packet to the destination host, which is a client task, may both be performed within a single loop of the merged telephone client and server process 45. When a single process is used to provide client and server functionality, speed and efficiency may be gained. If the processing of sending and receiving packets is a continuous loop, which executes very quickly, remote processes (remote client and server processes) need not have "knowledge" that a single process is executing and performing both client and server tasks. A single process may provide quick and seamless communications and in some cases may be preferred for speed and memory savings over separate telephone client and server processes.

Similarly, the client and server processes running on the originating host computer 3 under control of the originating caller may be merged into one process which handles both transmission and reception of data packets from the packet-switched network 5. The single client and server process is used to place a call from remote host computer 3 to a telephone handset 10.

The order in which the telephone client and server processes (or single merged process) perform their respective functions may be changed within the scope of the invention. For example, the initial steps before the loop of each process may be reordered. Step 35 in telephone client process 14 of FIG. 7 may take place before the setup socket step 34 occurs for example, without changing the general nature of the present invention. Other features described in the present invention, such as socket communications, are also not meant to be limiting. Various forms of interprocess communication are used within packet-switched networks. Though the preferred embodiment uses socket communications in a TCP/IP environment, other communications architectures may support the present invention. Other examples include, but are not limited to, using the Serial Line Interface Protocol (SLIP) or the Point-to-Point Protocol (PPP) for packet-switched communications. Still further, the client and server processes may execute on separate central processing units in a multitasking operating system environment. Operating systems which support multitasking, such as various versions of the Unix operating system as well as Microsoft Inc. Windows NT operating system, may enhance performance of the client and server software of the present invention.

Another feature which is not meant to be limiting is the use of mu-law audio encoding. Many types of audio encoding schemes are known, including compression techniques and encryption techniques, which transform speech signals into audio data in the form of bytes for transmission on a packet-switched network. Since mu-law encoding is a common North American standard, it is preferred.

Another feature of the present invention which is not meant to be limiting is the process by which a telephone number designates a destination gateway host computer. In the embodiments described above, the area code of the telephone number entered by the caller on the originating host computer was used to identify the destination gateway host address. In another embodiment of the present invention, the user may specify a destination gateway host computer to make a connection to the circuit-switched network. The user in this case designates the network address of the gateway host computer, and then specifies a telephone number after the connection to the gateway host computer is made. In this embodiment, the user has greater control over the routing of voice data packets on the packet-switched network, since the user chooses the gateway host computer which serves as the interface between the packet-switched network and the circuit-switched network.

An embodiment where a user controls gateway host computer selection may have advantages, depending on the application of the present invention. A dedicated gateway host computer may handle all of the phone calls into and out of a certain geographical region between a packet-switched and circuit-switched network. For example, a corporation with a building having a local, internal, circuit-switched telephone network may have a gateway host computer linking this internal circuit-switched network with a packet-switched network, such as the Internet. Employees of the company who travel may place a call from a personal computer, which is connected to the Internet in a remote location for example, to an employee/user of the internal circuit-switched telephone system within the company building.

In this example, client and server software programs such as the client 15 in FIG. 6 and the server 16 in FIG. 7, are pre-loaded onto the user's portable computer. When the user reaches a destination location, for example, a business meeting taking place in another country, the user may connect the portable computer to an Internet connection and place a call to an employee's telephone on the internal circuit-switched network within the company's building. A gateway host computer in the building links the internal circuit-switched network with the Internet. This allows intercommunication between these two employees without incurring long-distance circuit-switched telephone costs. This example is not meant to be limiting, and other aspects of this embodiment of the present invention can be envisioned by those skilled in the art.

Thus far, an example of a call placed from a computer on a packet-switched network to a telephone handset on a circuit-switched network has been shown and described as one example of the present invention. According to another aspect of the present invention, a call may be placed from a telephone handset connected to the circuit-switched network, such as the PSTN. The call may be destined for a user of a remote host computer connected to a packet-switched network, such as the Internet. Generally, the reverse of the processing required to place a call from the packet-switched network to a circuit-switched network is used.

Figure 8B:
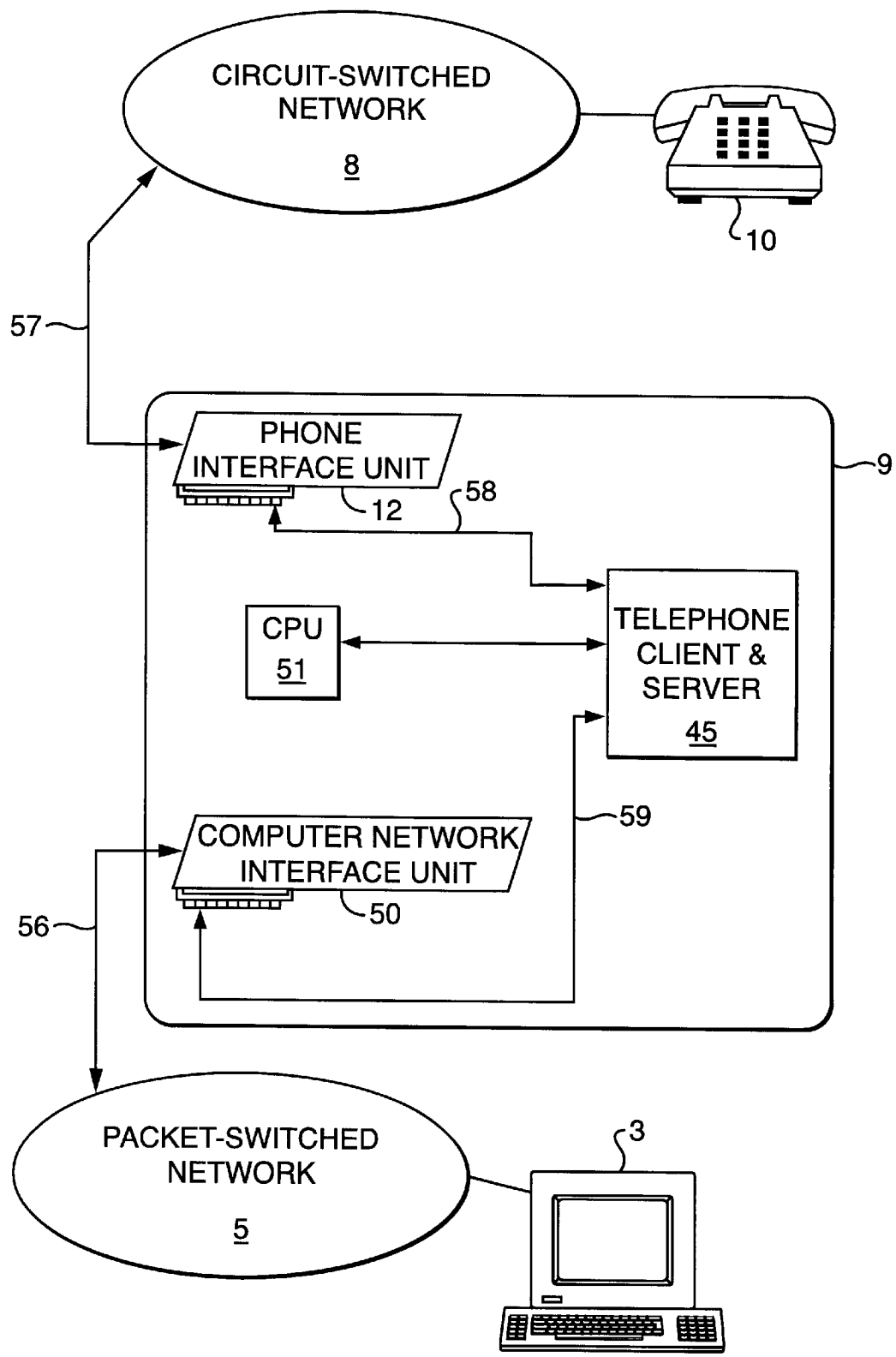
FIG. 8B is a block diagram of a gateway host computer using a single telephone client server process.

Reference is made to FIG. 8B, which shows the telephone client and server process 45 as merged into one computer process. A call placed from the circuit-switched network to a computer user on the packet-switched network will be described. The user of the telephone handset 10 on the circuit-switched network 8 (e.g. PSTN) lifts the handset 10 and dials a telephone number which is a dedicated phone number assigned to the gateway host computer 9. The call is received by the phone interface unit 12 through the phone line 57. When the incoming call is received by the phone interface unit 12, a signal (not shown) to the operating system of the gateway host computer from the phone interface unit starts a telephone client-server process 45 executing on the gateway host processor. Starting a process in this manner is well known to those skilled in the art and can be accomplished via an interrupt, for example. Upon startup, the telephone client-server process 45 anticipates an incoming call and sets up a connection between itself and the phone interface unit 12 over internal bus line 58 to receive the incoming call. Thus far, no destination host or user has been identified by the caller in the circuit-switched network. The telephone client-server process 45 then may prompt the caller, for example, by sending a predefined audio message to the telephone handset 10 of the caller on the circuit-switched network 8. Examples of predefined messages are commonly found in voice mail and voice activated response systems. The predefined message may request that the user enter a destination host address and user name of the called party. The predefined message may be provided by the phone interface unit 12, or by the telephone client server process 45.

The predetermined audio message sent to the calling party may serve a variety of other purposes as well. For example, the calling party may be prompted to enter numbers which designate a destination host IP address. The calling party may then be prompted to enter a name of a user who is logged into the destination host computer 3. Another method to obtain the destination address information is by voice analysis, wherein the calling party speaks the username/hostname words and the computer deciphers these addresses using speech recognition technology, known to those skilled in the art.

At this point, the telephone client server process 45 may attempt to initiate socket communications with the destination host computer 3 and verify that a person with the requested name is using the destination host computer. Verification that the destination computer user being called wishes to accept the call may also be made at this time. When this verification is made, the telephone client-server process 45 initiates full-duplex voice communications as described above in connection with FIGS. 5A and 5B. This entails setting up socket communication for the telephone client process as described above. If the destination host computer or user is unable to accept the connection, the calling party on the circuit-switched network may be notified by another predefined message. The calling party may then try again later. It is not necessary for the gateway host computer to maintain a list of remote host computer users who may accept calls from circuit-switched networks.

A call from the packet-switched network to the circuit-switched network has been described in connection with the system of FIGS. 5A and 5B, and a call from the circuit-switched network to the packet-switched network has been described in connection with the system of FIGS. 8A and 8B. It will be understood either type of call may be placed on both systems.

Additional features may be provided in accordance with the present invention. For example, upon reception of an incoming call from a circuit-switched PSTN, the telephone client-server process 45 may prompt the telephone caller to enter an account number. The account number may be predefined with a service provider that provides the voice calling features of the present invention. When the user of the circuit-switched telephone handset enters an appropriate account number, the communication session may proceed as previously described. At the end of the session, the telephone client-server process may record the length of time, or the amount of information transferred during the voice communication session, for billing purposes or other reasons. Similarly, the telephone client-server process may initially prompt the user to enter a credit card number and perform a credit authorization check before allowing a call to proceed. Since users of the system of the present invention may seek reduced cost by communicating over packet-switched networks, long-distance service may be provided by the gateway host computer over the packet-switched network at a reduced cost, as compared to a call made solely on a circuit-switched network.

In another embodiment of the present invention, the telephone client-server process may obtain an account number from the circuit-switched telephone user. The system then allows the selection of called parties based on code numbers previously defined by the circuit-switched telephone user or the holder of the account. Since designating IP host addresses and users names can be tedious using a standard twelve digit keypad of a telephone handset, predefined code numbers which designate host name and user name combinations may speed the process of call connection. Furthermore, the holder of an account may provide a limited set of codes to users of the service. In this example, an employee of a company may only have access to a subset of different host name and user name predefined codes, and thus may only be able to place calls to those selected users. This allows some level of security for users of the gateway host computer on the Internet for example. In another example, the telephone client-server process may maintain a lookup table to retrieve the correct destination host and user name on the packet-switched network in response to a calling party selection.

Figure 9:
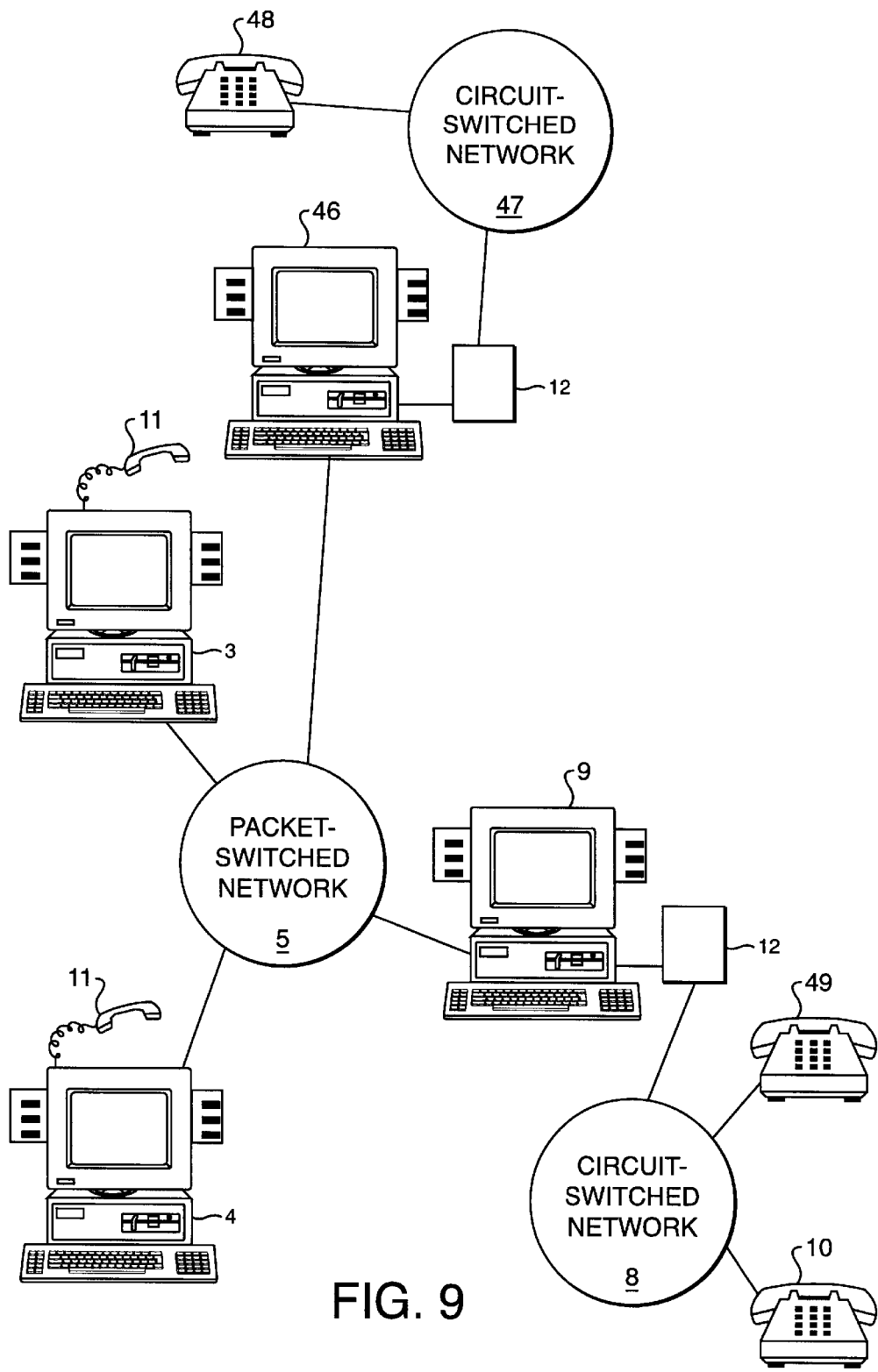
FIG. 9 is a block diagram of a system including a packet-switched network connected to two circuit-switched networks through separate gateway host computers.

In another embodiment of the present invention, the packet-switched communication mechanisms serve as the data communications path in an intermediate fashion as shown in FIG. 9. In this embodiment, a circuit-switched telephone user may place a call from handset 10 to another circuit-switched telephone handset. The called number may corresponds to either a local or a long distance telephone number. The call is first routed over the circuit-switched network 8 to gateway host computer 9 which interfaces to a packet-switched network 5. A telephone client-server process and the previously described hardware of the gateway host computer 9 accepts the call and initiates communications with a destination gateway host computer 46 remotely located on the packet-switched network 5. When the destination gateway host computer 46 receives the call setup signal from the source gateway host computer 9, the destination gateway host computer 46 then may initiate a call to the destination telephone number of handset 48, on a circuit-switched network 47 which may be geographically local to the destination gateway computer 46. When the destination user answers the telephone call on the destination telephone handset 48, the source and destination gateway host computers 9 and 46 operate as described above to control voice communications between the two users of the circuit-switched networks 9 and 47, using the packet-switched network 5 as an intermediate link. The originating caller may have no knowledge of the underlying packet-switched nature of the call handling.

According to this embodiment of the present invention, an extremely high bandwidth packet-switched network, using a medium such as fiber optic cable and high speed transmitters, may handle several simultaneous real-time voice communication sessions between circuit-switched networks located in remote geographic areas. For example, the circuit-switched network 47 of FIG. 9 may be located in Los Angeles and the other circuit-switched network 8 may be located in Boston. The present invention provides a mechanism and a method for voice data communications over long distances at reduced costs, as compared to calls made on conventional circuit-switched networks alone. Each caller places only a local call on the circuit-switched network to a gateway host computer. Packet-switched communications may be used to transmit the voice data between circuit-switched networks. This may save money by avoiding long distance circuit-switched network charges.

In another embodiment of the present invention described with reference to FIG. 9, the telephone client-server process which executes on the gateway computer 9 may initiate socket communications with multiple users on the packet-switched network 5 in a conference call fashion. In this embodiment, an originating caller, placing a call from telephone handset 10 on circuit-switched network 8, calls the gateway host computer 9 linked to the packet-switched network 5. After call reception, the caller designates multiple host/user name combinations, such as remote hosts 3 and 4. The telephone client-server process initiates socket communications with each of the designated host/user name destinations as described previously. During the voice communication session, voice signals, received at the phone interface unit 12 from the circuit-switched caller on handset 10, are duplicated by the telephone client-server process executing on the gateway host computer 9. The voice data packets are sent to each host/user name destination combination at host computers 3 and 4.

In this embodiment, the users at host computers 3 and 4 on the packet-switched network 5 each hear the voice of the circuit-switched caller from handset 10. Similarly, voice data packets received by the telephone client-server process from remote host computer 3 or 4 are forwarded to each of the other users in the communication session on the packet-switched network 5, as well as sent to the phone interface unit 12 for transmission to the circuit-switched telephone user on handset 10. The telephone client-server process must handle multiple communication sockets and keep track of which packets are sent to which destinations. Thus, when any one user in the communications session speaks, each of the other users hears that user.

Multiple circuit-switched calls may be handled in the same way that purely circuit-switched conference calls are handled in conventional circuit-switched conference calling systems. However, the present invention provides the ability to link multiple users from both packet and circuit-switched networks. As an example, referring again to FIG. 9, the phone interface unit 12 may handle multiple circuit-switched phone call connections, from multiple handsets 10 and 49, at one time. The conferencing aspect of such a system may be handled by channeling the voice signals from handsets 10 and 49 separately to a telephone client-server process executing on the gateway host computer 9. The telephone client-server process then redirects all of the voice signals coming from each of the circuit-switched channels and from each of the packet-switched channels to all of the other channels on both the circuit and packet-switched networks. Since the present invention operates with data packets in bytes, data manipulation and tracking using known data management schemes is facilitated. The users of the conferencing system on host computers 3 and 4 and handsets 49 and 10 hear each other simultaneously. In effect, the telephone client-server process acts as a broadcaster by send any segment of voice data to all other active conference channels on the circuit and packet-switched networks.

As an example of the present invention using a data management scheme, the only channel, circuit or packet-switched, which does not receive conference call voice data is the channel which provided the voice data. This conference call method provides advantages over conventional circuit-switched conference calling methods, since the telephone client-server process may easily keep track of which portions of voice data came from which channels. In effect, the voice data is apportioned into manageable segments which can be stored and transferred in buffers. For example, incoming voice data from host computer 3 is transmitted to handsets 10 and 49 via the phone interface unit, and is also transmitted on the packet-switched network via the computer network interface unit to host computer 4. However, the outgoing voice data from host computer 3 is not sent back to host computer 3 by the telephone client-server process. The telephone client-server process only needs knowledge of the incoming voice data source and the parties to the conference call in order to duplicate the data to as many other channels, circuit or packet switched, as is necessary to implement the desired conference call. Security features and encryption techniques, such as not routing voice data from certain users to called parties who do not have security clearance, may be provided as well via the present invention.

While there have been shown and described what are at present considered the preferred embodiments of the present invention, it will be obvious to those skilled in the art that various changes and modifications beyond those suggested may also be made therein without departing from the scope of the invention as defined by the appended claims.

What is claimed is:

1. A system for establishing voice communication between an Internet and a circuit-switched network, comprising:
   a network interface unit coupled to the Internet;
   a phone interface unit coupled to the circuit-switched network;
   a gateway processor coupled to the network interface unit and the phone interface unit and configured, in conjunction with the network interface unit and the phone interface unit, to:
      receive a call request from at least one of a phone coupled to the circuit-switched network and a host coupled to the Internet, and
      establish two-way voice communication, via the Internet and the circuit-switched network, between the phone and the host responsive to the call request,
      wherein the gateway processor is further configured to:
         designate each of one or more code numbers as corresponding to a respective host of a plurality of hosts coupled to the Internet, the call request comprising one of the one or more code numbers,
         wherein the two-way communication is established between the phone and the respective host corresponding to the one of the one or more code numbers.

2. The system of claim 1, wherein the circuit-switched network comprises the Public Switched Telephone Network.

3. The system of claim 1, wherein the gateway processor is further configured to:
   receive an account number from the phone, wherein the two-way communication between the phone and the host is further established based on the received account number.

4. The system of claim 1, wherein the gateway processor is further configured to:
   record a duration of the two-way voice communication.

5. The system of claim 4, wherein the gateway processor is further configured to:
   initiate billing of a party associated with at least one of the phone and the host based on the recorded duration.

6. The system of claim 1, wherein the gateway processor is further configured to:
   record an amount of information transferred between the phone and the host during the two-way voice communication.

7. The system of claim 6, wherein the gateway processor is further configured to:
   initiate billing of a party associated with at least one of the phone and the host based on the recorded amount of information.

8. The system of claim 1, wherein the gateway processor is further configured to:
   receive a credit card number from at least one of the phone and the host prior to establishing the two-way voice communication.

9. The system of claim 8, wherein the gateway processor is further configured to:
   initiate billing of the credit card number subsequent to establishing the two-way voice communication.

10. The system of claim 1, wherein each of the one or more code numbers is associated with a host name and user name that corresponds to a respective host of the plurality of hosts.

11. A method of establishing voice communication between an Internet and a circuit-switched network, comprising:
    interconnecting a gateway between the Internet and the circuit-switched network;
    receiving, at the gateway, a call request from at least one of a phone coupled to the circuit-switched network and a host coupled to the Internet;
    establishing two-way voice communication, via the Internet, the circuit-switched network and the gateway, between the phone and the host responsive to the call request; and
    designating each of one or more code numbers as corresponding to a respective host of a plurality of hosts coupled to the Internet, the call request comprising one of the one or more code numbers,
    wherein the two-way communication is established between the phone and the respective host corresponding to the one of the one or more code numbers.

12. The method of claim 11, wherein the circuit-switched network comprises the Public Switched Telephone Network.

13. The method of claim 11, further comprising:
    receiving an account number from the phone, wherein the two-way communication between the phone and the host is further established based on the received account number.

14. The method of claim 11, further comprising:
    recording a duration of the two-way voice communication.

15. The method of claim 14, further comprising:
    billing a party associated with at least one of the phone and the host based on the recorded duration.

16. The method of claim 11, further comprising:
    recording an amount of information transferred between the phone and the host during the two-way voice communication.

17. The method of claim 16, further comprising:
    billing a party associated with at least one of the phone and the host based on the recorded amount of information.

18. The method of claim 11, further comprising:
    receiving a credit card number from at least one of the phone and the host prior to establishing the two-way voice communication.

19. The method of claim 18, further comprising:
    billing the credit card number subsequent to establishing the two-way voice communication.

20. The method of claim 11, wherein each of the one or more code numbers is associated with a host name and user name that corresponds to a respective host of the plurality of hosts.

21. A system for establishing voice communication between an Internet and the Public Switched Telephone Network (PSTN), comprising:
    a network interface unit coupled to the Internet;
    a phone interface unit coupled to the PSTN;
    a gateway processor coupled to the network interface unit and the phone interface unit and configured, in conjunction with the network interface unit and the phone interface unit, to establish two-way voice communication, via the Internet and the PSTN, between a phone coupled to the PSTN and a host coupled to the Internet, wherein the gateway processor is further configured to:

designate each of one or more code numbers as corresponding to a respective host of a plurality of host computers coupled to the Internet, the call request comprising one of the one or more code numbers, wherein the two-way communication is established between the phone and the respective host corresponding to the one of the one or more code numbers.

22. The system of claim 21, wherein the gateway processor is further configured to:

receive an account number from the phone, the two-way communication between the phone and the host being further established based on the received account number.

23. The system of claim 21, wherein the gateway processor is further configured to:

record a duration of the two-way voice communication.

24. The system of claim 23, wherein the gateway processor is further configured to:

initiate billing of a party associated with at least one of the phone and the host based on the recorded duration.

25. The system of claim 21, wherein the gateway processor is further configured to:

record an amount of information transferred between the phone and the host during the two-way voice communication.

26. The system of claim 25, wherein the gateway processor is further configured to:

initiate billing of a party associated with at least one of the phone and the host based on the recorded amount of information.

27. The system of claim 21, wherein the gateway processor is further configured to:

receive a credit card number from at least one of the phone and the host prior to establishing the two-way voice communication.

28. The system of claim 27, wherein the gateway processor is further configured to:

initiate billing of the credit card number subsequent to establishing the two-way voice communication.

29. The system of claim 21, wherein each of the one or more code numbers is associated with a host name and user name that corresponds to a respective host of the plurality of hosts.

* * * * *